(12) United States Patent
Ergan et al.

(10) Patent No.: US 7,500,091 B2
(45) Date of Patent: Mar. 3, 2009

(54) DELAY START-UP OF APPLICATIONS

(75) Inventors: Cenk Ergan, Bellevue, WA (US); Dan Li, Redmond, WA (US); Michael R. Fortin, Redmond, WA (US); Robin Giese, Bellevue, WA (US); Robert L. Reinauer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 11/290,105

(22) Filed: Nov. 30, 2005

(65) Prior Publication Data

US 2007/0121665 A1 May 31, 2007

(51) Int. Cl.
G06F 9/44 (2006.01)

(52) U.S. Cl. ............................ 713/1; 713/1; 717/120; 717/127; 717/130

(58) Field of Classification Search ............ 713/1, 713/2; 717/120, 127, 130
See application file for complete search history.

(56) References Cited

U.S. PATENT DOCUMENTS

| | | | |
|---|---|---|---|
| 5,835,759 A | 11/1998 | Moore et al. | |
| 5,867,160 A * | 2/1999 | Kraft et al. | 715/803 |
| 5,968,173 A | 10/1999 | Watts, Jr. | |
| 6,091,414 A * | 7/2000 | Kraft et al. | 715/807 |
| 6,122,677 A * | 9/2000 | Porterfield | 710/10 |
| 6,275,932 B1 | 8/2001 | Yamaguchi et al. | |
| 6,324,546 B1 | 11/2001 | Ka et al. | |
| 6,367,074 B1 * | 4/2002 | Bates et al. | 711/170 |
| 6,564,318 B1 | 5/2003 | Gharda et al. | |
| 6,785,808 B2 * | 8/2004 | Huntington et al. | 713/2 |
| 6,948,165 B1 | 9/2005 | Luu et al. | |
| 7,243,245 B2 * | 7/2007 | Pagan | 713/300 |
| 7,299,346 B1 * | 11/2007 | Hollis | 713/2 |
| 2002/0122076 A1 | 9/2002 | Nakaki | |
| 2002/0147966 A1 * | 10/2002 | Frazier | 717/127 |
| 2002/0147967 A1 * | 10/2002 | Frazier | 717/127 |
| 2004/0093489 A1 | 5/2004 | Hsu | |
| 2004/0260956 A1 | 12/2004 | Pagan | |
| 2005/0204198 A1 | 9/2005 | Pagan | |
| 2005/0268014 A1 * | 12/2005 | Geib et al. | 710/240 |

OTHER PUBLICATIONS

"Windows Vista: Fast On and Off," Microsoft Corporation 2005, http://www.microsoft.com/windowsvista/confident.mspx.
Cox, "Startup Gardian 1.0.8," Free Downloads Center 2001-2005, http://www.freedownloadscenter.com/Utilities/System_Maintenance_and_Repair_Utilities/Startup_Guardian.html.
"Simple Organizer Version 2.5 Build 222 Release," Global Copyright 2005, Annie McGuire, http://www.fraudaid.com/security_products/categories/spyware/startup_org_spw.htm.
"Absolute StartUp manager for the absolute control over all startup programs!," F-Group Software 2001-2005, http://www.absolutestartup.com/features.html.

* cited by examiner

Primary Examiner—Abdelmoniem Elamin
(74) Attorney, Agent, or Firm—Marshall, Gerstein & Borun LLP

(57) ABSTRACT

A delay of starting up of certain applications may result in improving the overall performance of a system. The applications to be delayed may be placed in a container object or box such that they can be tracked and that other applications dependent on the delayed applications can be appropriately handled.

20 Claims, 3 Drawing Sheets

DELAY START-UP OF APPLICATIONS

BACKGROUND

Computer operating systems offer numerous ways of registering applications to be launched when the computer is powered up or when users are logged on. These startup applications can be a major cause of performance issues at boot (power-up) and at logon time. At install time, software applications often register themselves as startup applications without considerations of whether that is necessary for the user. The users often are confused and don't know how to turn off this option, the end result being a large number of startup applications on the average user's machines that take a long time to initialize. During this initialization, they consume system resources on the machine, even though most of them are unnecessary or unwanted by the user immediately and can be started at a slower pace. A large number of Microsoft Windows customers have to wait a long time to be able to start using their computer after logging on because of this issue. Of course, there are startup applications that are necessary and important such as instant messenger, anti-virus, or anti-spyware applications.

SUMMARY

A delay in starting up certain applications may result in improving the perceived performance of a system. This can be accomplished by delaying the time at which these processes are launched, and/or by reducing these processes' priorities for various system resources, such as processor, I/O, or memory resources. This allows these resources to be available to the user more quickly for whatever purposes the user desires, rather than having to wait for the startup applications to finish initializing. In addition, a user interface may be disclosed for allowing a user to adjust start-up priorities.

DRAWINGS

Figure 1:
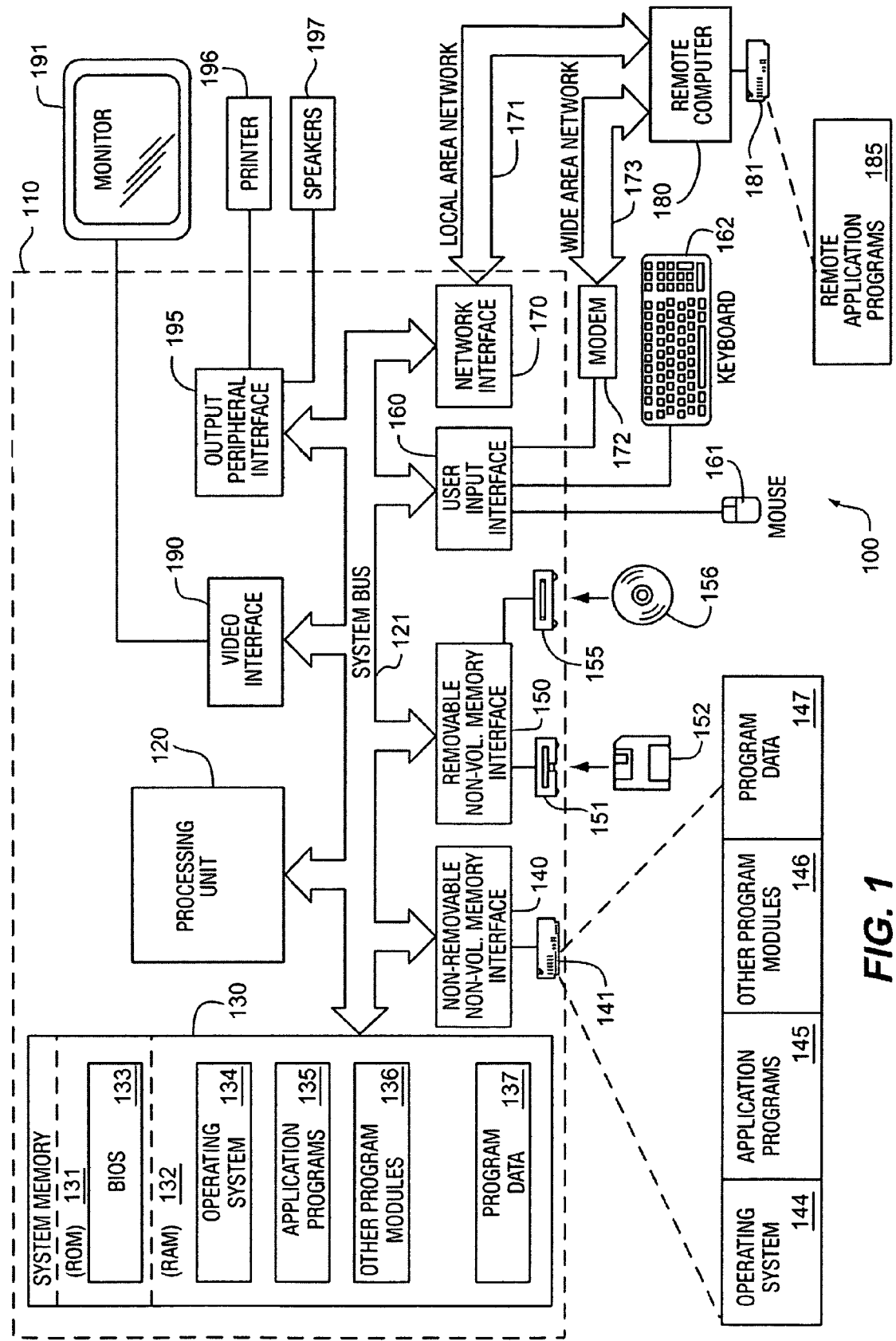
Figure 2:
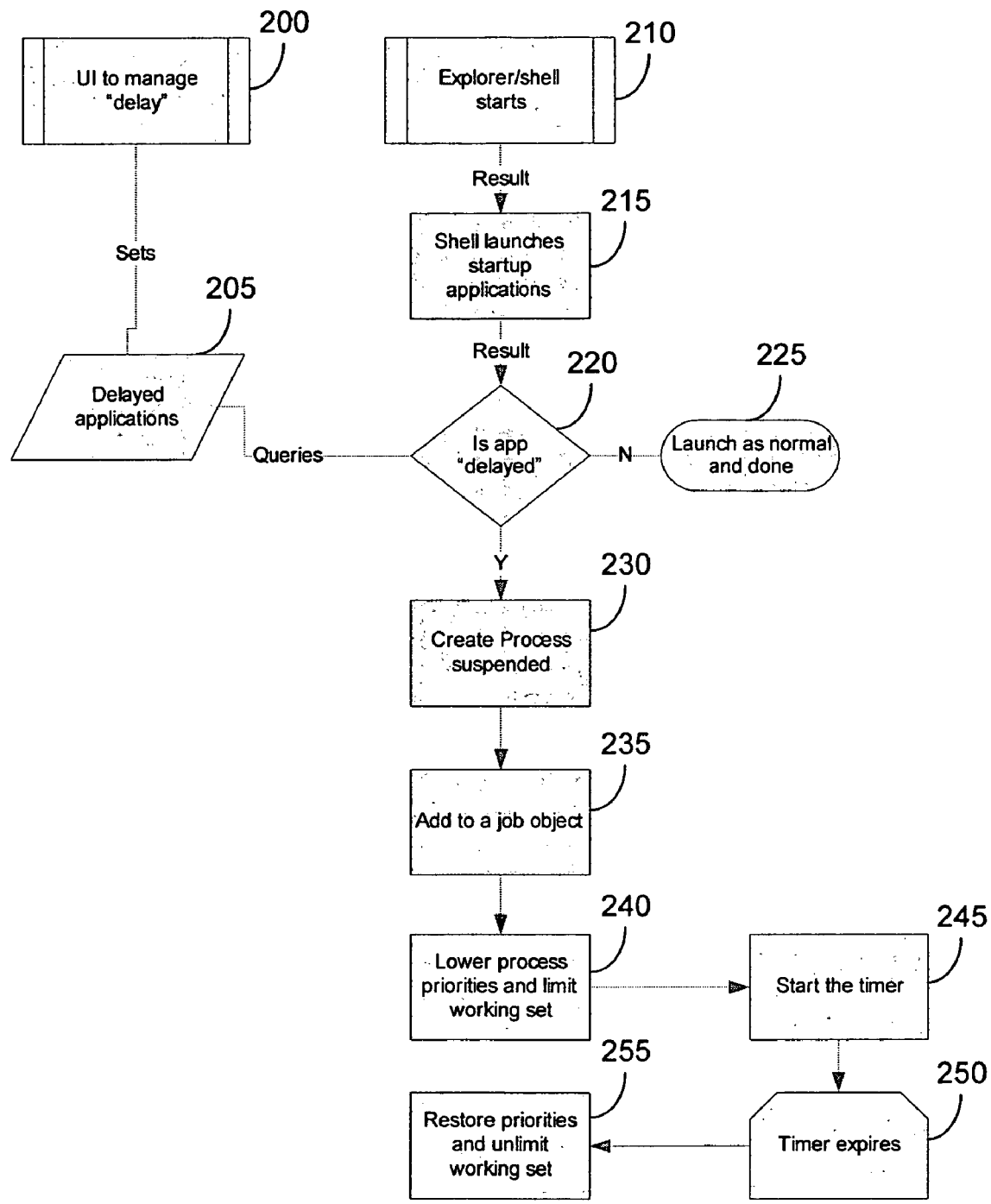
Figure 3:
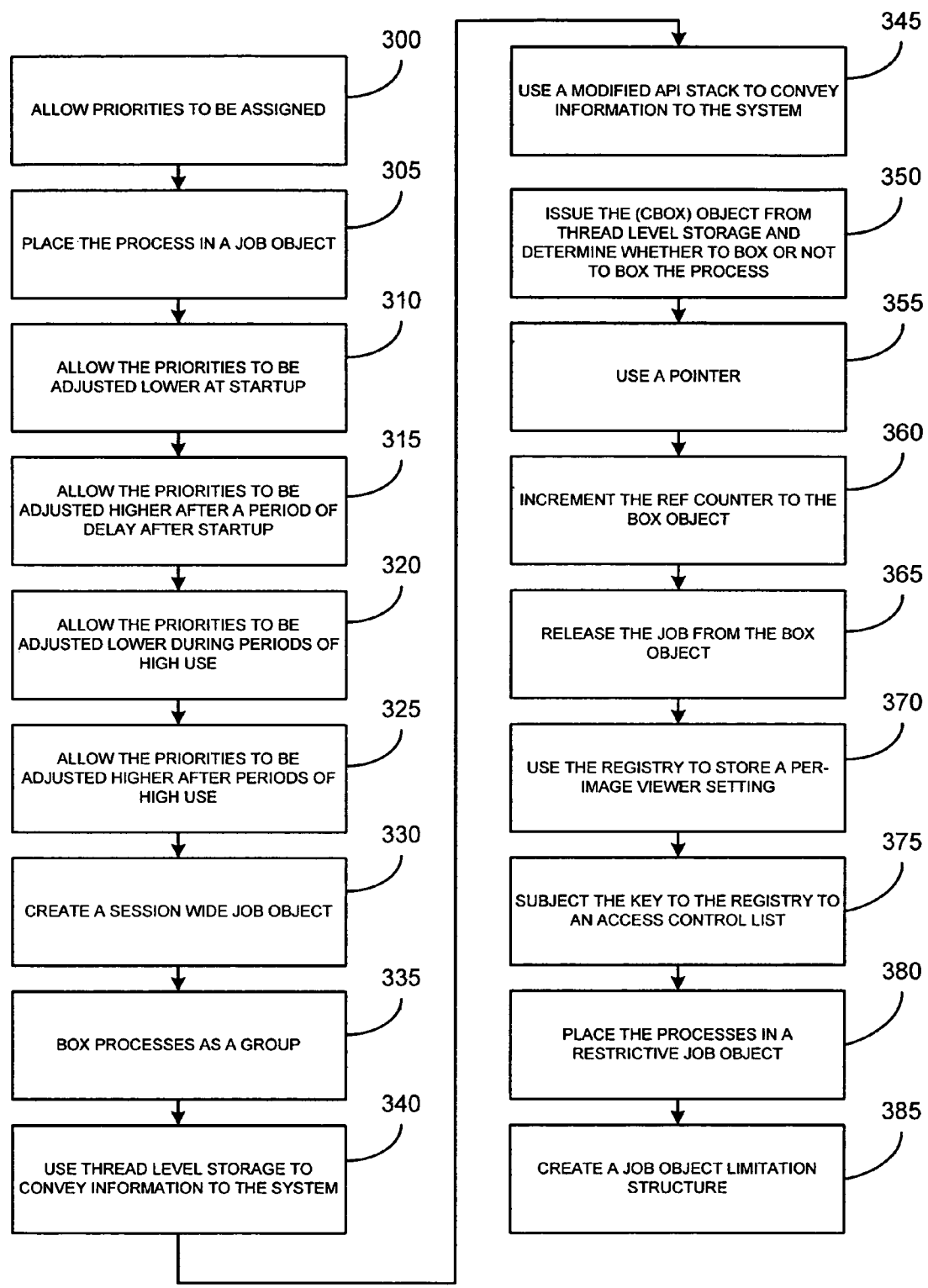

FIG. 1 is a block diagram of a computing system that may operate in accordance with the claims;

FIG. 2 may be a high-level illustration of a method in accordance with the claims; and FIG. 3 may illustrate another embodiment of a method in accordance with the claims.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Delayed Start-Up Of Applications

It would be useful to offer users the options to "remove" startup applications from the startup process by removing them from the various registration points, such as "Run" registry keys etc., but there are several issues with this feature. First, the startup applications often monitor these registration points and add themselves back in. Second, by completely removing applications from the startup sequence, some functionality may be inadvertently broken or missing.

A method of "delaying" startup applications, allowing users to take back control of their computer at logon and not have to completely remove the startup applications from startup is one solution and is described below. The impact of startup applications on a user's system may be reduced by limiting these processes' CPU, I/O, and memory consumption by lowering their respective priorities for these types of system resources. As startup applications are launched, the method may lower their CPU, I/O, and page priorities, and place them in some tracking object. This method is referred to as "boxing". After a configurable period, the method may restore their priorities to the original settings.

FIG. 2 may be a high-level illustration of a method in accordance with the claims. At block 200, a user may use a user interface to set a certain application to be delayed. At block 205, the method may store the selected application to be stored in a memory. At block 210, the operating system may begin. At block 215, the method may launch start-up applications. At block 220, the method may determine if a particular application has been stored at block 210 as a process to be delayed. If the determination is no, at block 225, the method may be launched as normal and the method may end. If the determination at block 220 is yes, the method may suspend the create process for the particular application 230. At block 235, the method may add the particular application to be delayed to a job container object. At block 240, the method may lower the process priorities for the particular application and the method may limit a working set. At block 245, a timer may be started and at block 250, the timer may expire. At block 255, the priorities of the particular application may be restored and the method may un-limit the working set.

In one embodiment, a protected key in the system registry contains an exception list that allows boxing to be turned on or off on a per-image path basis. For example, all applications that are not listed on the exception list may be boxed or placed in a container object.

The operating system needs to track the initial and derived processes being boxed. For example, if a startup application is being boxed, and the given application process launches a child process, that child process should also be boxed, and should also be unboxed when the parent (initial) process is unboxed. In Microsoft Windows, Job objects can be used to accomplish this task.

The method will be most effective if it can guard against startup applications re-raising their priorities before they are supposed to be unboxed, as this would greatly reduce the benefits of the method. In Microsoft Windows, Job objects can be used to impose priority restrictions on processes that the processes cannot escape from, unless the original creator of the Job object (i.e. the box, and therefore, the operating system), actively decides to lift the restrictions, such as when unboxing the given applications.

The method may use the system registry to store a per-image file name setting as to whether a process (via the name of its executable image file) should be boxed if it is run as a startup application. In a Windows system, special care may need to be taken for universal mechanisms like "rundll32.exe" that can execute many different features, and therefore, the user's intentions may be best reflected if there is finer-grained control over these features than a blanket restriction on "rundll32.exe". The method may need to access control limit ("ACL") the key such that the common startup application would not be able to modify its own settings in that key.

Once the method has launched all the startup applications, the method may set the box object to release the job (i.e. release the processes from their restrictions and restore their priorities) after a certain configurable timeout (e.g. 30 seconds).

The method may also tie in with other parts of the operating system to detect whether a user is interacting with a boxed application, and use that information to unbox the given application before its boxing timeout has expired. This allows the operating system to reduce the cost of unwanted startup applications in the common case, but also to dynamically detect when an application becomes wanted by the user, at which point the priority restrictions would be harmful to the user's experience with the system. The method of detecting user activity for these applications should prevent spoofing of activity by the applications, as this would subvert the usefulness of the method. The knowledge that a startup application is being used interactively may also be kept as historical data, and be used to prevent it from being boxed in the future, which would likely improve the user's experience. One simple example approach to determining when a user is interacting with a startup application is to check repeatedly whether any of the startup applications' windows has become a foreground window, and whether the mouse cursor is located within that window.

FIG. 3 may illustrate another embodiment of a method in accordance with the claims. At block 300, the method may allow priorities to be assigned to one of a process' priority class, I/O priority, priority page, working set and networking capabilities. At block 305, the method may place the process in a job object in order that the process and dependent processes may be tracked. At block 310, the method may allow the priorities to be adjusted lower at startup and at block 315, the method may allow the priorities to be adjusted higher after a period of delay after start-up. At block 320, the method may allow the priorities to be adjusted lower during periods of high use. At block 325, the method, after the periods of high use, may allow the priorities to be adjusted higher. At block 330, the method may create a session wide job object that all start-up applications will be joined. At block 335, the method may box processes as a group and not allow a single process to be unboxed alone. At block 340, the method may use thread level storage to convey information to the system that boxing is requested. This may be accomplished by creating a (CBox) object in a "Run Startup Apps Thread" and reserving a thread level storage pointer to the (CBox) adjacent. At block 345, the method may use a modified API stack to convey information to the system that boxing is requested. At block 350, the method may at process creation, issue the (CBox) object from thread level storage and determine whether to box or not to box the process. At block 355, the method, may use a pointer that is a ref—counted pointer. At block 360, the method may increment the ref counter to the box object pointed to by the thread level storage slot. At block 365, the method may set to release the job from the box object after a configurable time period. At block 370, the method may use the registry to store a per-image viewer setting as to whether that image should be boxed if it is run as a start-up application. At block 375, the method may subject the key to the registry to an access control list such that a common start up application would not be able to modify its own settings in the key. At block 375, the method may place the processes in a restrictive job object as the processes are launched such that the boxed applications cannot break the priority settings, that the association with a job cannot be broken until the job object is destroyed and that the restrictions set by the job object cannot be overwritten by the boxed processes. At block 380, the method may create a job object limitation structure that controls I/O and page priority limits.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of managing system priorities comprising:
    allowing priorities to be assigned to at least one of a process' CPU (processor) priority class, I/O priority, memory page priority, memory working set, and networking capabilities;
    placing the process in a container object in order that the process and dependent processes may be tracked;
    allowing the priorities to be adjusted lower at an application startup;
    allowing the priorities to be adjusted higher after a period of delay after startup; and
    optionally restoring the priorities to the original settings during or after a configurable time period session.

2. A method according to claim 1, further comprising allowing the priorities to be adjusted lower during periods of high use.

3. A method according to claim 1, further comprising after the periods of high use, allowing the priorities to be adjusted higher.

4. A method according to claim 1, further comprising creating a session wide container object that all start-up applications will be joined.

5. A method according to claim 1, further comprising adding processes to the container object as a group.

6. A method according to claim 1, further comprising setting to release the process from the container object after the configurable time period.

7. A method according to claim 1, further comprising detecting user Interaction with processes in the container object, and dynamically removing their restrictions, and/or using historical information to prevent them from being placed in the container object in the future.

8. A method according to claim 1, further comprising using a registry to store a per-image file name setting as to whether the given process should be placed in the container object if it is run as a startup application.

9. A method according to claim 8, further comprising subjecting a key to the registry to an access control list such that a common startup application would not be able to modify its own settings in the key.

10. A method according to claim 1, further comprising placing the processes in a restrictive container object as the processes are launched such that:
    the applications in the container object cannot break the priority settings;
    that the association with a process cannot be broken until the container object is destroyed; and
    the restrictions set by the container object cannot be overwritten by the processes in the container object.

11. A method according to claim 1, further comprising creating a job object limitation structure that controls I/O and page priority limits.

12. A computer readable storage medium comprising computer executable instructions for managing system priorities comprising computer executable instructions for:
    allowing priorities to be assigned to at least one of a process' CPU priority class, I/O priority, memory page priority, memory working set, networking capabilities;
    placing the process in some container object that all start-up applications will be joined in order that the process and dependent processes may be tracked;
    allowing the priorities to be adjusted lower at startup;
    allowing the priorities to be adjusted higher after a period of delay after start-up; and
    optionally restoring the priorities to the original settings during or after a configurable time period.

13. The computer readable storage medium of claim 12, further comprising computer executable instructions for at least one of:
    allowing the priorities to be adjusted lower during periods of high use;
    after the periods of high use, allowing the priorities to be adjusted higher;
    creating a session wide container object that all start-up applications will be joined;
    adding processes to the container a group; and
    setting to release the process from the container object after the configurable time period.

14. The computer readable storage medium of claim 12, further comprising computer executable instructions for detecting user interaction with processes in the container object, and dynamically removing their restrictions, and/or using historical information to prevent them from being placed in the container object in the future.

15. The computer readable storage medium of claim 12, further comprising computer executable instructions for using a registry to store a per-image file name setting as to whether the given process should be placed in the container object if it is run as a startup application.

16. The computer readable medium of claim 15, further comprising computer executable instructions for subjecting the key to the registry to an access control list such that a common startup application would not be able to modify its own settings in the key.

17. The computer readable storage medium of claim 12, further comprising computer executable instructions for placing the processes in a restrictive job object as the processes are launched such that:
    the applications in the container object cannot break the priority settings;
    that the association with a process cannot be broken until the container object is destroyed; and
    the restrictions set by the container object cannot be overwritten by the processes in the container object.

18. The computer readable storage medium of claim 12, further comprising computer executable instructions for creating a process object limitation structure that controls I/O and page priority limits.

19. A computer system comprising a processor, a memory, and an input/output device, the processor being adapted to execute instruction comprises instructions for:
    allowing priorities to be assigned to at least one of a process' CPU priority class, I/O priority, memory page priority, memory working set, networking capabilities;
    placing the process in a container object that all start-up applications will be joined in order that the process and dependent processes may be tracked;
    allowing the priorities to be adjusted lower at startup;
    allowing the priorities to be adjusted higher after a period of delay after start-up; and
    optionally restoring the priorities to the original settings during to after a configurable time period.

20. The computer system of claim 19, further comprising instructions placing the processes in a restrictive job object as the processes are launched such that:
    the applications in the container object cannot break the priority settings;
    that the association with a process cannot be broken until the process object is destroyed; and
    the restrictions set by the container object cannot be overwritten by the processes in the container object.

* * * * *